United States Patent
Milivojevic et al.

(10) Patent No.: US 10,560,033 B2
(45) Date of Patent: Feb. 11, 2020

(54) SOLAR HYBRID SOLUTION FOR SINGLE PHASE STARTING CAPACITOR MOTOR APPLICATIONS

(71) Applicant: SunTech Drive, LLC, Boulder, CO (US)

(72) Inventors: Nikola Milivojevic, Boulder, CO (US); Yusuf Gurkaynak, Arvada, CO (US)

(73) Assignee: SunTech Drive, LLC, Boulder, CO (US)

( * ) Notice: Subject to any disclaimer, the term of this patent is extended or adjusted under 35 U.S.C. 154(b) by 158 days.

(21) Appl. No.: 15/907,035

(22) Filed: Feb. 27, 2018

(65) Prior Publication Data

US 2019/0267910 A1   Aug. 29, 2019

(51) Int. Cl.
| | |
|---|---|
| *H02K 27/04* | (2006.01) |
| *H02M 5/458* | (2006.01) |
| *H02P 3/18* | (2006.01) |
| *H02P 25/16* | (2006.01) |
| *H02P 25/04* | (2006.01) |
| *H02M 1/10* | (2006.01) |

(52) U.S. Cl.
CPC ............ *H02M 5/458* (2013.01); *H02M 1/10* (2013.01); *H02P 3/18* (2013.01); *H02P 25/04* (2013.01); *H02P 25/16* (2013.01)

(58) Field of Classification Search
CPC .. H02P 1/44; H02P 1/445; H02P 25/04; H02P 1/265; H02P 3/18; H02P 4/00
USPC ........... 310/174, 68 R, 68 E, 68 A, 179–190; 318/784–797, 817
See application file for complete search history.

(56) References Cited

U.S. PATENT DOCUMENTS

| | | | | |
|---|---|---|---|---|
| 2,280,971 | A | 4/1942 | Packer | |
| 3,484,670 | A | 12/1969 | Shankwitz | |
| 4,012,678 | A * | 3/1977 | Blaha | H02P 1/44 318/794 |
| 4,794,288 | A * | 12/1988 | Lewus | H02K 17/08 310/68 B |
| 4,820,964 | A * | 4/1989 | Kadah | H02P 1/42 318/786 |
| 5,103,154 | A * | 4/1992 | Dropps | H02H 9/047 318/782 |

(Continued)

FOREIGN PATENT DOCUMENTS

WO   WO 2017/066307 A1   4/2017

OTHER PUBLICATIONS

PCT/US2019/019881 International Search Report and Written Opinion dated May 8, 2019, 8 pp.

*Primary Examiner* — Thanh Lam
(74) *Attorney, Agent, or Firm* — Lathrop GPM LLP (57) ABSTRACT

A motor control system for induction-type AC electric motors having starting and run windings has a multiphase VFD drive with first and second phase outputs. A switching device with a first position, where a first output of the VFD drive is coupled to the run winding and a second output of the VFD drive couples to the start winding; and with the switching apparatus in second position, the run winding of the AC electric motor couples to an AC line input and the start winding of the AC electric motor couples through a capacitor and start switch to the AC line input. With the switching device in the first position, the second output of the VFD is configured to discontinue driving the start winding of the motor after the motor begins rotating.

11 Claims, 6 Drawing Sheets

(56) References Cited

U.S. PATENT DOCUMENTS

| | | | | |
|---|---|---|---|---|
| 5,162,718 A | * | 11/1992 | Schroeder | H02P 1/445 |
| | | | | 318/781 |
| 5,212,435 A | | 5/1993 | Dutro | |
| 5,247,236 A | * | 9/1993 | Schroeder | H02P 1/445 |
| | | | | 318/781 |
| 6,320,348 B1 | * | 11/2001 | Kadah | H02P 1/42 |
| | | | | 318/785 |

* cited by examiner

SOLAR HYBRID SOLUTION FOR SINGLE PHASE STARTING CAPACITOR MOTOR APPLICATIONS

BACKGROUND

Electric motors are widespread and practically used in many applications. There are two general group of motors based on the electrical supply: single phase and three phase. Single phase motors are typically used in household and small power applications, while three phase motors are mainly used in industrial applications, where a three phase electricity supply is provided.

The number of single phase motors used worldwide is around 75%, compared to 25% of three phase ones, but the power level of single phase motors is significantly smaller than those supplied by three phase electricity.

SUMMARY

There are several types of single phase motors, and they are commonly supplied from 115 Vac or 230 Vac AC grid, or from AC generators. However, with affordable solar photovoltaic (PV) technology, there is need to run those widely used single phase motors off of both AC and DC (solar or battery) sources for applications that require long duration operation. During the day solar PV system can provide power for single phase motors, while during cloudy days or nights the single phase motor can be switched to be directly powered by AC source.

A proposed solar hybrid solution for single phase motors with starting capacitor solves the problem of running those specific single phase motors off of solar, and then switching the power supply to be directly from the grid when desired.

In an embodiment, a motor control system for induction-type AC electric motors having starting and run windings has a multiphase VFD drive with first and second phase outputs. A switching device with a first position, where a first output of the VFD drive is coupled to the run winding and a second output of the VFD drive couples to the start winding; and with the switching apparatus in second position, the run winding of the AC electric motor couples to an AC line input and the start winding of the AC electric motor couples through a capacitor and start switch to the AC line input. With the switching device in the first position, the second output of the VFD is configured to discontinue driving the start winding of the motor after the motor begins rotating.

In another embodiment, a method of operating a single-phase AC electric motor having a run winding and a start windings on AC line or solar power includes providing a switching apparatus with a first and a second position, wherein with the switching apparatus in the first position, a first output of a variable frequency motor drive is coupled to the run winding of the AC electric motor, and a second output of the variable frequency motor drive is coupled to the start winding of the AC electric motor; and with the switching apparatus in the second position, the run winding of the AC electric motor is coupled to an AC line input connection and the start winding of the AC electric motor is coupled through a capacitor and start switch to the AC input connection. The method includes determining whether solar power is present, and if solar power is present setting the switching apparatus to the first position, attempting to start the motor with a phase shift between the first and second output of the variable frequency drive, and if the motor starts disconnecting the second output of the variable frequency drive; and if solar power was not present or the motor failed to start, setting the switching apparatus to the second position.

DETAILED DESCRIPTION OF THE EMBODIMENTS

Figure 1:
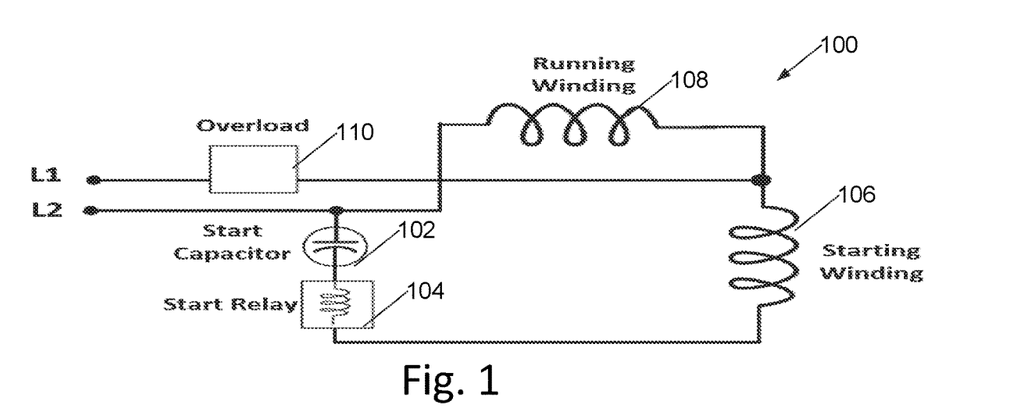
FIG. 1 is a wiring diagram of a single phase induction motor with starting capacitor and starting relay in a starting winding circuit, a running or main winding in a main circuit, with overload protection common to both circuits.

FIG. 1 illustrates a single phase induction motor 100 with starting capacitor 102 and starting relay 104 in a starting winding 106 circuit. A running or main winding 108 is in a main circuit, with overload protection as a common block.

Single phase induction motors 100 require a second phase applied to starting winding 106 to induce initial rotation, or start, in addition to power applied to the main winding 108, the starting winding providing a magnetic field phase shifted, in most embodiments about 90 electrical degrees, in respect to the main winding. The starting winding 106 allows the motor to create a starting torque. The phase shift applied to the starting winding is typically achieved with capacitor 102 in series with starting winding 106. Once the motor starts rotating, there is no need for starting winding 106; the starting winding is typically disconnected after rotation begins because it dissipates heat when in the circuit. Switch or starting relay 104 disconnects the starting winding 106 from the circuit once the motor starts. The starting relay 104 can sense current or voltage limits, but the most common type in surface motors is a centrifugal relay that opens when the motor shaft speed reaches around 80% of rated speed. The starting winding 106 with starting capacitor 102 thus drops out of the circuit leaving only the main winding 108 energized, after the motor 100 starts rotating.

The same single phase motor 148 (FIG. 2) can be run by a three phase variable frequency drive 150 powered from a solar source 151, if the wire that connects starting winding 153 to start relay 152 is disconnected from start relay 152, and connected directly to a starting phase PH2 154 of the three phase variable frequency drive 150. That way, starting capacitor and the relay are not in the start winding circuit anymore. Once the motor has started rotating, the starting phase 154 of the variable frequency drive may drop out of the circuit, leaving the main phase PH3 156 and common return PH1 158 coupled to the main or run winding 160.

Figure 2:
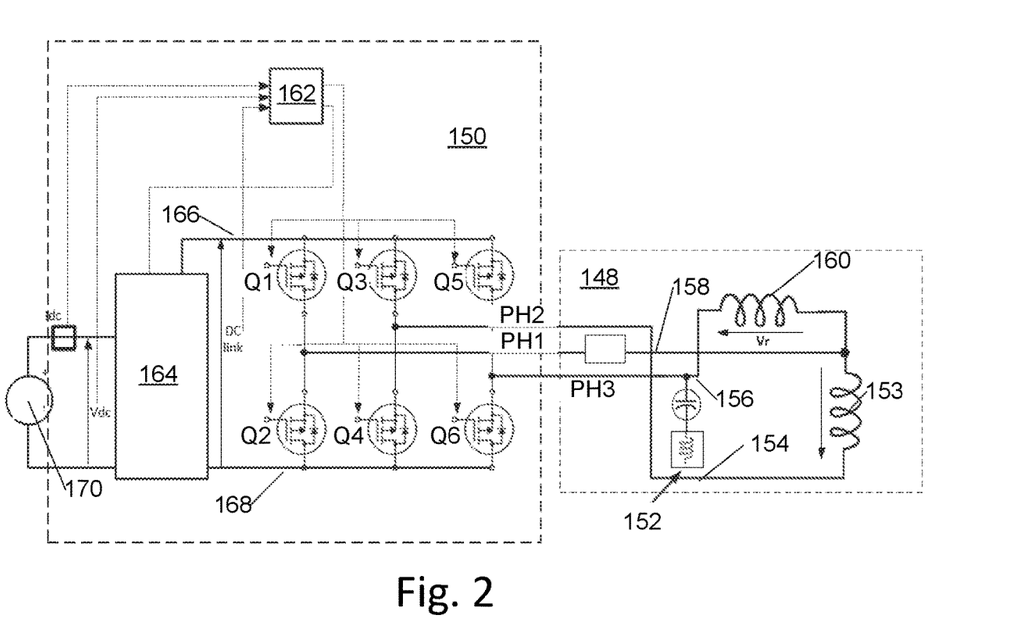
FIG. 2 illustrates schematically a single phase motor powered by a DC (solar or battery) source and driven by a Variable Frequency Drive (VFD) using the starting winding with a separate phase of the VFD.

Variable frequency drives (VFDs) typically have six power switches (Q1 to Q6), configured as a three phase inverter. Each switches Q1-Q6 is controlled by microcontroller 162 that generates pulse-width modulated (PWM) signals at a high switching frequency, typically on the order of few to a hundred kilohertz, in order to generate an approximately sinusoidal current signal on each phase of the motor winding. Such VFDs can be fed directly by a solar power source, but also a voltage boost circuit 164 may be used when input DC voltage Vdc is insufficient for proper VFD operation. Boost circuit 164 has at least one high switching frequency power switch, controlled by a boost control signal generated at microcontroller 162. The boost circuit 164 regulates a DC link 166, 168 voltage that feeds switches Q1-Q6 of the VFD. Microcontroller 162 reads DC link and input solar 170 voltage to generate appropriate duty cycle—boost control signals for controlling boost circuit 164, in turn regulating voltage on DC link 166, 168.

Before connecting to variable frequency drive (VFD), a single phase motor with start capacitor can be rewired as a three wire single phase motor, if the wire that connected starting winding to start relay is disconnected from the start relay. Furthermore, if existing running (main) winding is connected to phases: Ph1 and Ph3, and a "starting" winding is connected to Ph2 154, the start capacitor and relay are removed from the start winding circuit. the running winding voltage (Vr) can be shown as:

$$Vr=Vph3-Vph1,$$

while voltage across starting winding (Vs) is:

$$Vs=Vph2-Vph1.$$

PWM signals for all six power switches (Q1-Q6) are generated by microcontroller 162 to create voltages Vph1, Vph2 and Vph3. Phases Vr and Vs are generated approximately 90 electrical degrees apart, in order to create starting torque that starts the motor. Microcontroller 162 can sense the moment motor starts rotating, by monitoring input DC voltage from solar DC source 170.

During start-up, microcontroller 162 generates PWM signals to create PH2 154 and PH1 158 voltages during each attempt to start the motor, as well as return voltage 156. The microcontroller increases the effective voltage and frequency of both motor winding voltages: Vr and Vs according to a V/f motor control algorithm until the generated frequency reaches 30 Hz, half of full speed for typical 60-Hz motors. Once the generated frequency reaches 30 Hz the microcontroller 162 stops generating voltage across the starting winding Vs by not activating power switches Q3 and Q4, and checks the input DC voltage Vdc to determine if motor 148 has started rotating. If the motor has started, the microcontroller continues with a Maximum Power Point algorithm, keeping the voltage/frequency control across the running winding only (Vr). If the microcontroller decided that motor has not started, then it shuts down the PWM signals and tries to start the motor again after a time delay.

Figure 3:
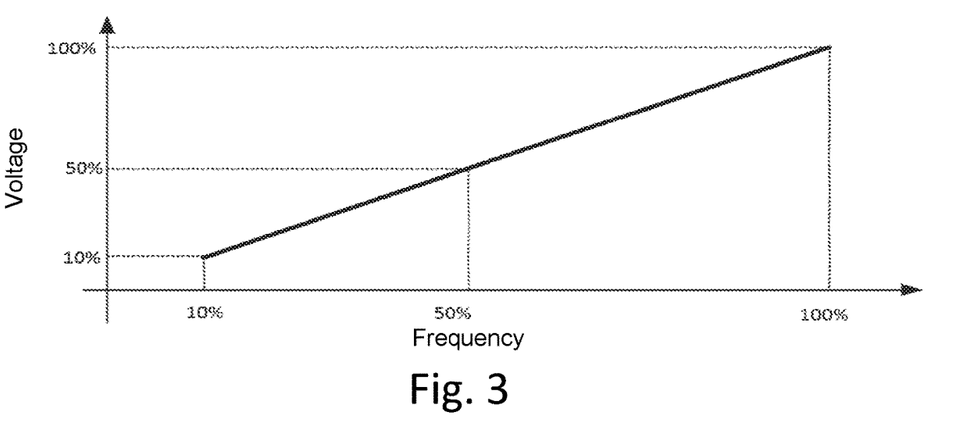
FIG. 3 illustrates a linear voltage versus frequency operating curve for use in controlling the VFD.

Once the motor has started rotating, the VFD continues to generate voltage Vr across the main winding using power switches Q1, Q2, Q5 and Q6, while leaving switches Q3, and Q4 quiescent as the starting winding is no longer used. Microcontroller controls VFD power switches according to frequency/voltage mode illustrated in FIG. 3. By adjusting motor 148's phase voltage and frequency at the same time, the VFD 150 provides variable speed operation of motor 148. Variable speed operation typically uses more power at high speeds than at low speeds, allowing adaption of motor power consumption to power available from the solar power source 170 or to motor's 148 speed requirements.

When VFD 150 is powered by a solar PV source 148, it may use an instantaneous power no greater than that provided by a power limit that varies based on the sun's irradiance (intensity). Therefore, VFD 150 uses variable speed control to balance the input solar power with motor load power. The system obtains as much power as possible from solar source 148 while running the AC motor as a load. Input voltage sensor (Vdc) is used as an input for microcontroller 162, which uses a maximum power point tracking (MPPT) mechanism to obtain maximum power from solar power source 170.

Figure 4:
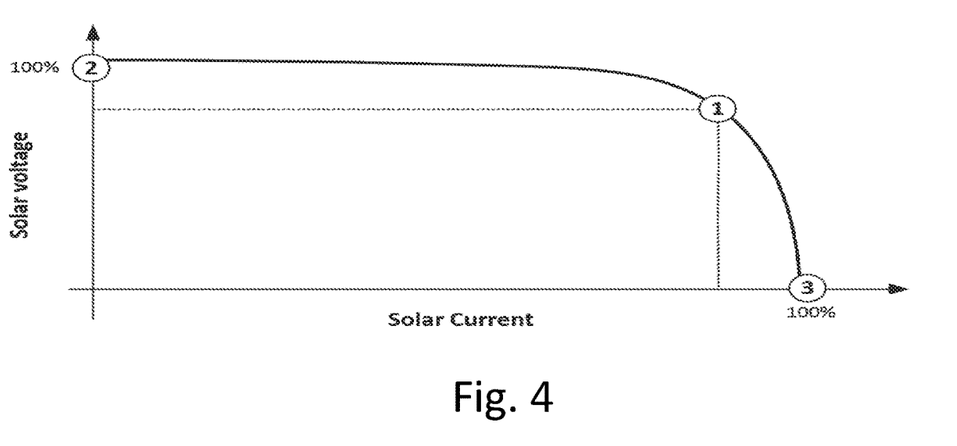
FIG. 4 illustrates a typical voltage current curve of photovoltaic panel output.

MPPT Algorithm:

A typical solar source load curve is illustrated in FIG. 4. The solar source has limited power; power available depends on the panels provided in the solar source, solar irradiance and ambient temperature. FIG. 4 shows solar load characteristic for a given temperature and irradiance.

Point 1 on FIG. 4 shows the operating point of the solar source at which it provides maximum power, known as the MPP point. If solar source is unloaded, voltage on the terminals of solar source is maximum, and solar current is zero (point 2), while if solar source is overloaded the current is maximum and solar source voltage drops towards zero (point 3).

An actual solar source operating point can be anywhere between points 2 and 3, but the source provides maximum power at if operated at MPP point 1.

Figure 5:
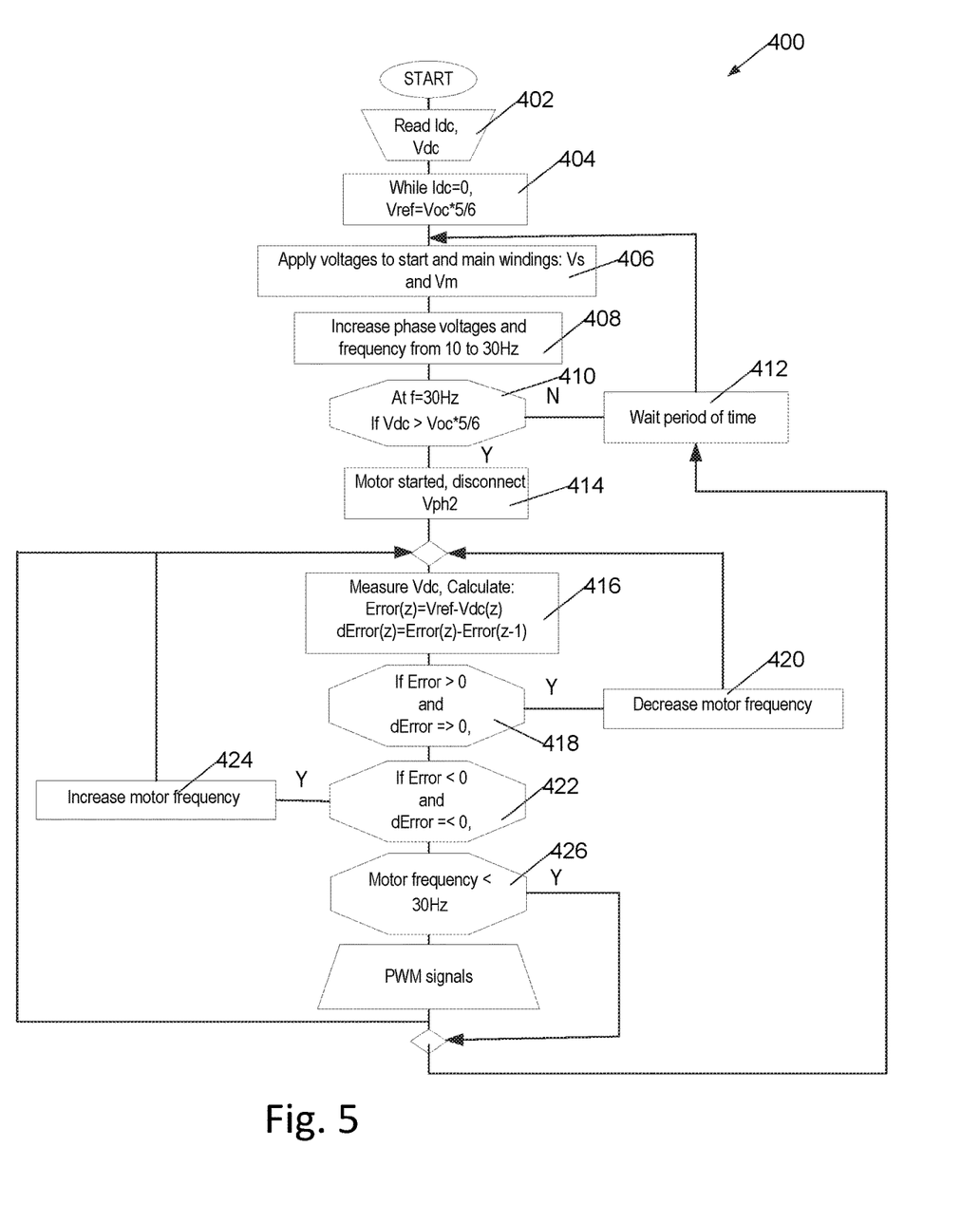
FIG. 5 is a flow chart of a maximum power point tracking algorithm.

With reference to FIG. 2 and FIG. 5, method 400 begins with microcontroller 162 (FIG. 2) measuring 402 voltage (Vdc) and current (Idc) from solar source, it saves a Vdc value for no load condition (Idc=0), an open circuit voltage (Voc) of the solar source 170—determining point 2 of FIG. 4. Microcontroller 162 then initializes 404 a reference voltage value Vref, as Vref=Voc*5/6, as an expected MPP voltage, and it attempts 406 to start the single phase motor 148 using PWM signals. Once the single phase motor 148 starts rotating, microcontroller 162 increases VFD frequency (speed) 408, increasing load on the solar source 170, in order to move solar source's operating point from point 2 toward point 1 (FIG. 4).

If panel voltage Vdc drops below Vref before motor 148 reaches 30 Hz, or half-speed, indicating the solar source is producing insufficient power to support low speed operation, microcontroller 162 shuts down the variable speed drive and waits 412 for a timeout period before attempting 406 to start the motor 148 again. If Vdc remains above Vref with the variable speed drive at 30 Hz and the motor rotating, microcontroller 162 shuts down PH2 154 while continuing to operate PH1 158 and PH3 156 to continue operating motor 148.

The MPPT algorithm in microcontroller 162 then measures input solar source voltage Vdc and calculates 416 two variables:

Error between reference voltage (initially defined as (Vref=Voc*5/6)) and instantaneous solar input voltage measured at input terminals at all times—Vdc->Error=Vref−Vdc. The error value is positive if instantaneous solar input voltage is lower than reference voltage Vref, meaning that solar source is loaded (higher current) more than the expected MPP point, while the error value is negative if solar source is underloaded with lower current than at the expected MPP point.

Derivative error is a difference in error values defined above for two successive sampling times of the microcontroller->dError=Error(z)—Error(z−1), where Error(z) is error calculated at instantaneous time, while Error(z−1) is error calculated in previous sampling time of the microcontroller. Hence, derivative error (dError) is positive if instantaneous error is higher than error in a previous sampling time, and negative if it's lower than the previous sampling time error.

The microcontroller 162 calculates error and derivate error values repeatedly, to provide instantaneous values, comparing them with values from prior sampling times. Depending on instantaneous and previous sampling values of error and derivative error the microcontroller decides whether to increase or decrease operating frequency for VFD 150.

1. If 418 the instantaneous error is positive and derivate error is positive or equal to zero, then microcontroller 162 decreases 420 the reference frequency signal for VFD 150, meaning that instantaneous operating point of the solar powered VFD 150 running single phase motor 148 is loading the solar source beyond MPP point, and should "slow down" in order to get to the MPP point from FIG. 4. If 426 VFD 150 and motor 148 frequency dips below a minimum frequency, such as 30 Hz, microcontroller 162 shuts down VFD 150 and waits 412 for the timeout interval before attempting 406 to start the motor again.
2. If 422 the instantaneous error is negative and derivate error is negative or equal to zero, then microcontroller 162 increases 424 the reference frequency for VFD 150 up to a maximum frequency such as 60 Hz, meaning that instantaneous operating point of the solar powered VFD 150 and motor 148 is below the MPP point, and the motor should "speed up" while drawing more power in order to get to the MPP point 1 (FIG. 4).

Apart from using error and derivative error for MPPT, the MPPT algorithm also monitors instantaneous absolute value of DC link voltage 166, 168. Boost circuit 164 decouples DC link voltage 166, 168 so the VFD is fed with constant voltage, so that microcontroller can perform MPPT operation and extract maximum power from solar source. However, if boost 164 loses voltage regulation of DC link voltage, DC link voltage will be below referenced value, and microcontroller 162 decreases motor's frequency by an increment; in a particular embodiment the increment is 5 Hz. This unloads the solar source should bring DC link voltage regulation back. However, if stepping back by 5 Hz was not enough, then there will be one or more successive 5 Hz step back steps, until VFD 150 and motor 148's frequency drops below a minimum operating frequency, such as 30 Hz, after which the microcontroller stops VFD operation—FIG. 5. In a particular embodiment the minimum operating frequency is 30 Hz This way, it's possible to run single phase motor using variable frequency drive powered from solar PV source. However, once the single phase motor is modified (by disconnecting starting winding wire from starting relay and connecting it to VFD), it's not possible to again run the motor using AC source, unless the starting winding wire is firstly disconnected from the VFD, and then physically reconnected to the same start relay.

Figure 6:
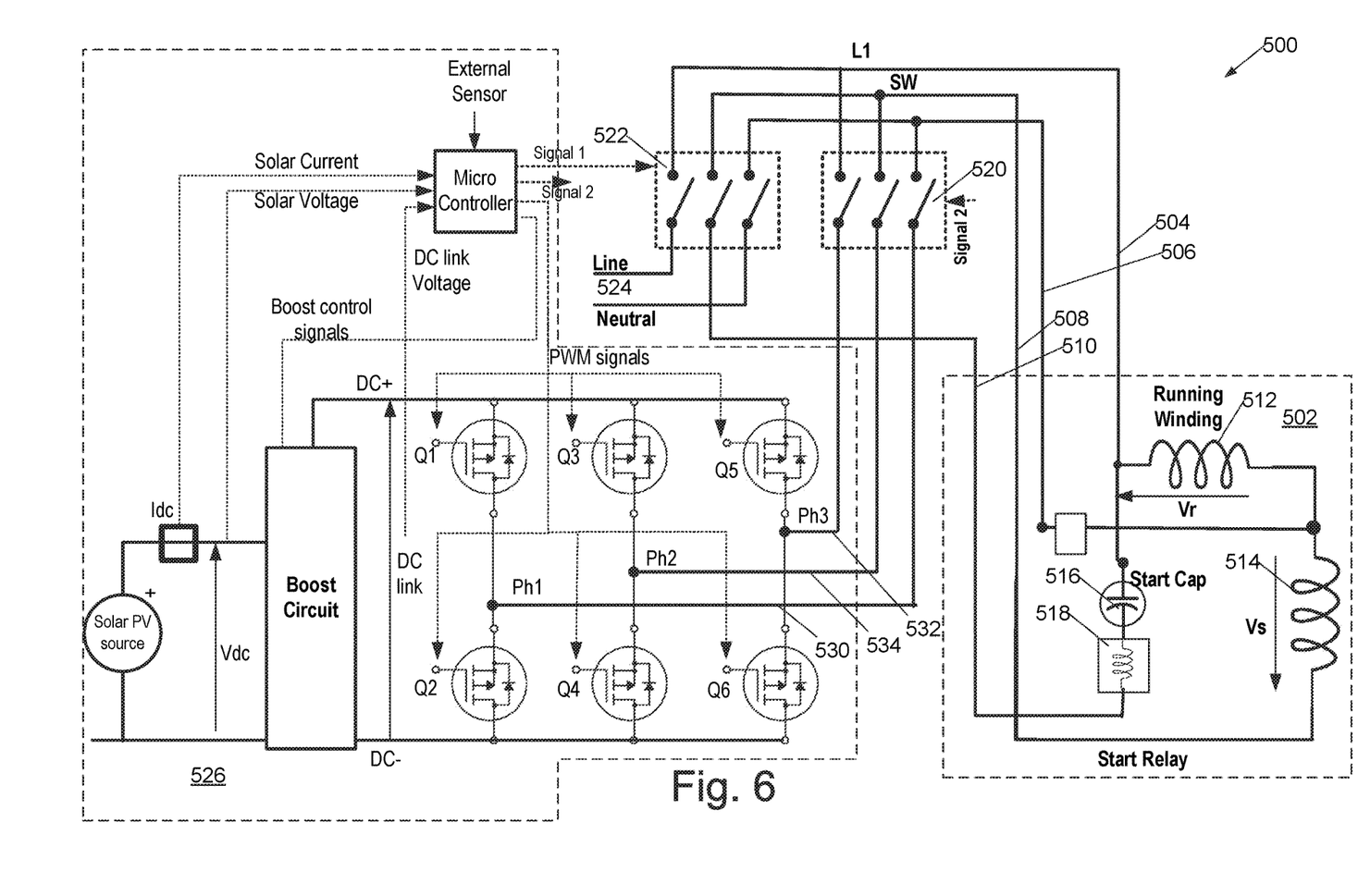
FIG. 6 illustrates a motor with a dual-mode motor-control system supporting variable frequency motor drive when operating on a solar power source and a capacitor start motor drive when operating on an AC line power source.

The motor system 500 of FIG. 6 shows a single phase motor 502 modified to have 4 leads where: L1 504 and L2 506 are running (main) winding 512, SW 508 and L2 506 drive the starting winding 514 and SR 510 is a starting capacitor 516 and relay 518 lead. Those four leads are connected to the single phase AC source 524 and three leads from variable frequency drive through separate contactors 520, 522, as shown in the FIG. 6. In an alternative embodiment, a three-pole, double-throw, break-before-make relay replaces both contactors 520, 522.

Main winding leads 504 and 506 are connected to AC line and neutral connections of the AC input 524 respectively through contactor 522, or to PH1 530 and PH3 532 connections of the VFD 526. Starting winding lead SW 508 is connected to starting relay SR lead 504 through contactor 522, or to Ph2 534 of VFD 526 through contactor 520.

Contactors 520, 522 can be energized (actuated) by signals 1 and 2 respectively, but are never energized at the same time. Both contactor control signals can be derived from the microcontroller or some other device with simple signal logic outputs, or manually using a switch.

If the DC source is Solar photovoltaic panels (PV), then the microcontroller or any other logical device may have a solar irradiance (sun intensity) sensor, adapted to sense when solar intensity is below certain redefined threshold, then it can switch contactor 520 OFF (using signal 2) to disconnect solar PV source, and then turn contactor 522 ON (using signal 1), to connect an AC source. A switching sequence is in reverse when the solar intensity sensor recognizes that solar power is available and switches from the AC source 524 back to solar PV source and variable frequency drive VFD 526.

Figure 7:
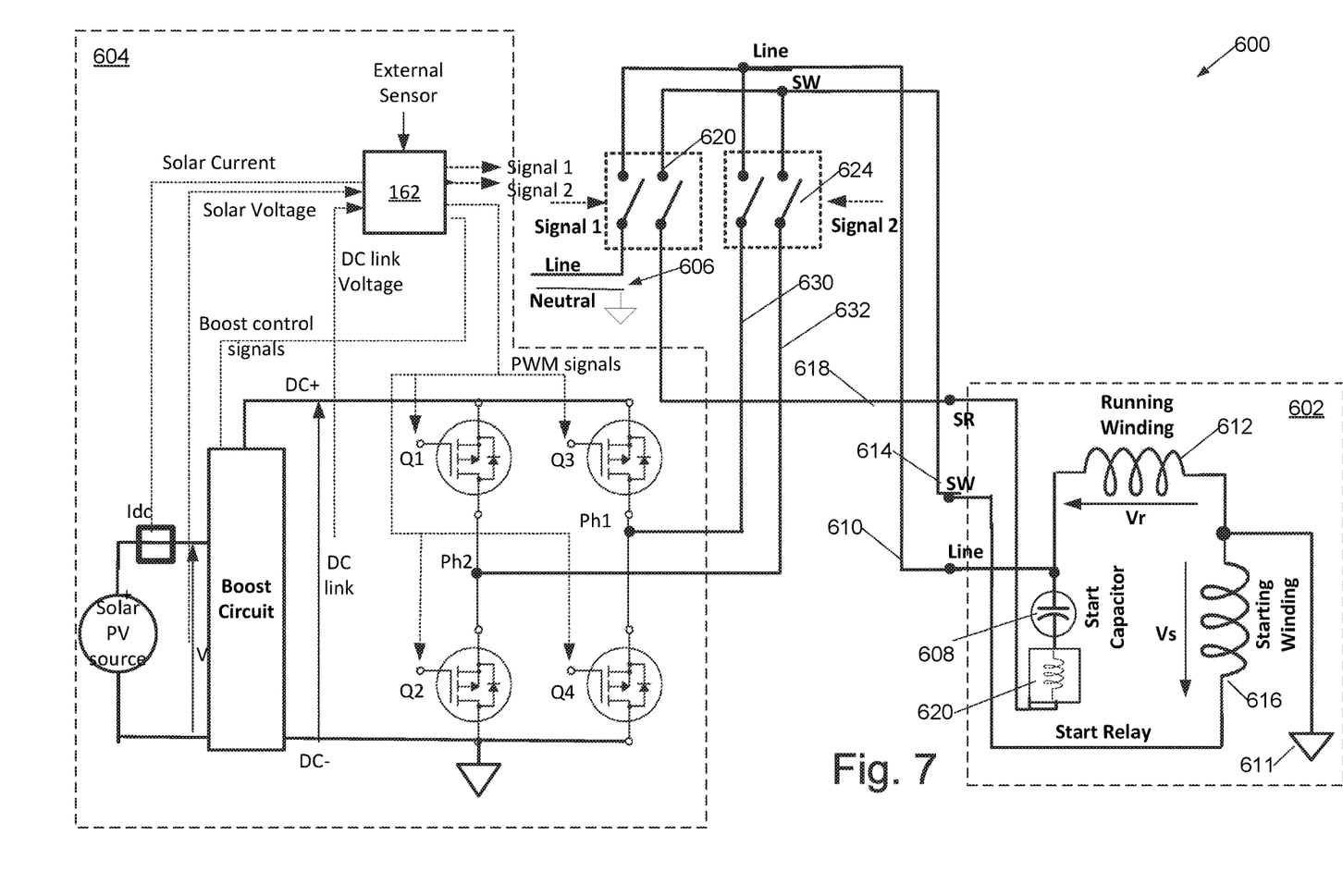
FIG. 7 illustrates a dual-mode control system operating a motor, the motor having a two-independent-phases VFD driven by solar power during daylight and a single phase with neutral AC input and starting capacitor at night.

In an alternative embodiment, when operation of the motor is desired, the microcontroller determines whether PV panel voltage Vdc is present, if Vdc is present the microcontroller attempts to start the motor on solar power with contactor 522, 620 off and contactor 520, 624 on. If the motor fails to start, such as when the sun is obscured by cloud, then then the microcontroller switches contactor 520, 624 OFF (using signal 2) to disconnect solar PV source, and then turn contactor 522, 620 ON (using signal 1), to connect an AC source.

During AC line operation, the system of FIG. 6 is effectively configured as a normal capacitor-start induction motor. During solar operation the system of FIG. 6 is effectively configured as an MPPT—VFD 3-phase drive system, with the run winding coupled to PH1 and PH3 and a phase-shifted start winding coupled to PH2, until rotation begins, when PH2 drops off.

Hybrid system operation can also be achieved if a time relay is used to drive signals 1 and 2 based on the time of the day, so that in the morning the solar source provides power for VFD 526 and motor 502 in 3-wire configuration, while in the evening signal 2 switches the contactors to activate AC source power to directly drive the motor 502 with the starting capacitor 516 in circuit.

An alternative system 600 (FIG. 7) has a dual-mode control system operating a single-phase induction motor 602, the motor run by a two-independent-phases VFD 604 driven by solar power during daylight and a single phase with neutral AC input 606 and starting capacitor 608 at night.

Single phase motor 602 is modified to have 4 leads where: line 610 and a neutral 611 are running (main) winding 612, SW 614 and neutral 611 drive the starting winding 616 and SR 618 is a starting capacitor 608 and relay 620 lead. Those 4 leads are connected to the single phase AC source 606 and two leads plus neutral from variable frequency drive 604 through separate contactors 622, 624. In an alternative embodiment, a two-pole, double-throw, break-before-make relay (not shown) replaces both contactors 622, 624.

Main winding leads 610 are connected to AC line and neutral connections of the AC input 606 respectively through contactor 620, or to PH1 630 of the VFD 526. Starting winding lead SW 614 is connected to starting relay SR lead 618 through contactor 620, or to Ph2 632 of VFD 604 through contactor 624.

Contactors 622, 624 can be energized (actuated) by signals 1 and 2 respectively, but are never energized at the same time. Both contactor control signals can be derived from the microcontroller or some other device with simple signal logic outputs, or manually using a switch.

During AC line operation, the system of FIG. 7 is effectively configured as a normal capacitor-start induction motor driving by line and neutral lines of the AC input 606. During solar operation the system of FIG. 7 is effectively configured as an MPPT—VFD 2-phase drive system, with the run 612 winding coupled to PH1 and a phase-shifted start winding 616 coupled to PH2 until rotation begins, after which PH2 drops off leaving the start winding 616 undriven.

In an alternative embodiment 800 (FIG. 8), a power price receiver device 802 is coupled to microcontroller 162 of at least one of two controllers 804, 806 according to FIG. 6 or FIG. 7 to receive rate data indicating periods of high cost electricity. In this embodiment, solar panels 808 provide solar power part, but not all, of each day; a first controller 804 is configured to run a deep well pump motor 810 on solar power if available, and on AC line 812 if sufficient power is available, however controller 804 is configured to run deep well pump motor 810 only if a water level in a cistern 814 is below a threshold as determined by water depth gauge 816 using adjustable thresholds 818.

Figure 8:
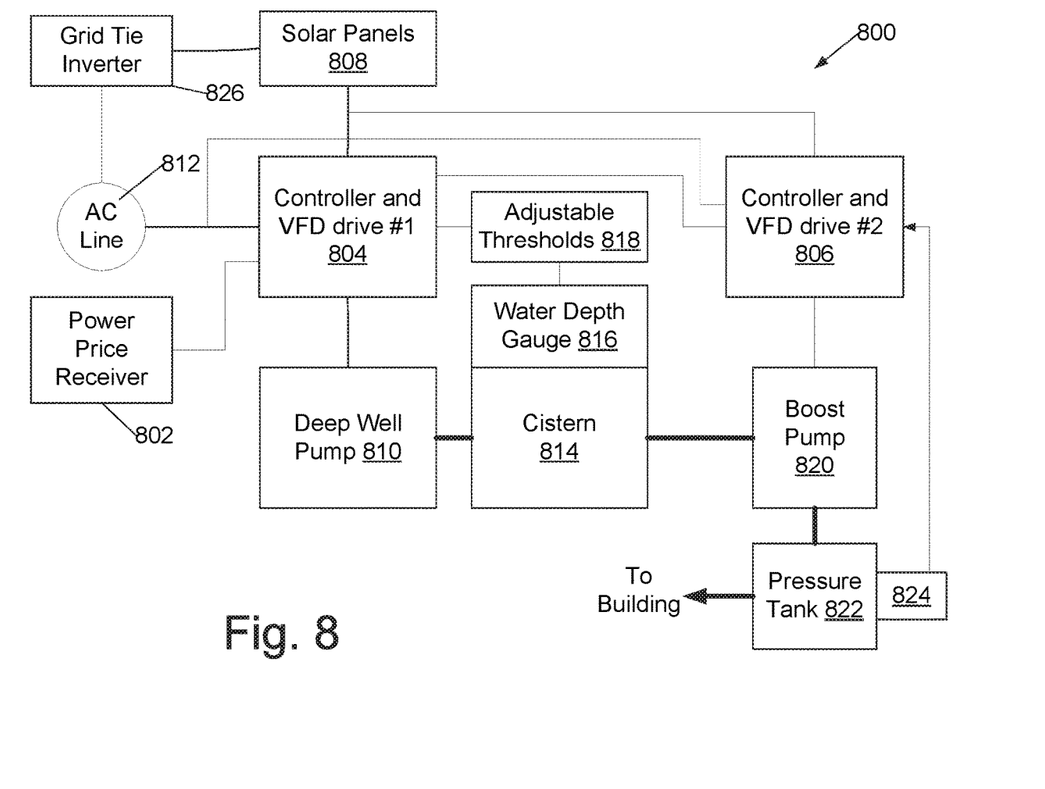
FIG. 8 illustrates an embodiment having a system with two controllers in communication with each other and an electric-rate receiver to optimize cost of pumping in a water system.

Cistern 814 serves as a storage device for output of well pump motor 812.

Adjustable thresholds 818 operate with water depth gauge 816 to provide a first, a second, and a third level indication. When water in cistern 814 drops below the first threshold, well pump motor 810 is activated by controller 804 on power from solar panels 808 if available, and on AC line 812 if not, the pump is activated regardless of AC power cost reported by power price receiver 802. This first threshold represents a minimum water level for the cistern requiring filling the cistern at all costs let water run out.

Should water be above the first threshold and below the second threshold, well pump motor 810 is activated by controller 804 on power from solar panels 808 if available, and on AC power only if AC power cost is reported to be low and power from solar panels 808 is unavailable. The second threshold represents a low-reserve level in the cistern, below which the system is authorized to spend on buying cheap AC power.

Should water be above the second threshold but below the third threshold, well pump motor 810 is activated by controller 804 on power from solar panels 808 only if power from solar panels 808 is available; with water above the second but below the third threshold the system is not authorized to spend on buying power for running the pump motor 810 to fill the cistern.

Should water be above the third threshold, all pumping of water ceases to avoid overflowing the cistern.

The second controller 806 is configured to run a boost pump 820 configured to pump water from cistern 814 to pressure tank 822, pressure tank 822 provides water to a building such as a home or business. Pressure tank 822 is fitted with a pressure switch 824 that feeds back to controller 806 to activate boost pump 820 when a water level, and thus pressure, in pressure tank 822 drops below a fourth threshold.

Since boost pump 820 has a higher priority than well pump motor 810, when controller 806 determines from pressure switch 824 that boost pump 820 must run, controller 806 communicates with controller 804 to determine if well pump 810 is operating, if so what power source well pump 810 is drawing from, and reported power cost.

In high-power-cost periods, controller 806 will run boost pump 820 on solar power if solar power is available—shutting down well pump 810 if insufficient power is available for both pumps 810, 820, but enough power is present to run boost pump 820; if no solar power is available then controller 806 runs boost pump 820 on the AC line 812. Well pump 810 is restarted as soon as the boost pump 820 shuts down In low-power-cost periods, controller 806 will run boost pump on solar power if solar power is available and well pump 810 is not running on solar power, otherwise controller 806 will run boost pump 820 on the AC line 812.

When both pumps 810, 820 are not running, and solar power is available, controller 804 instructs grid tie inverter 826 to divert power back into the AC line 812.

The system of FIG. 8 thus optimizes electric power charges for power drawn from AC line 812 by using storage capacity in the cistern. The system runs the well pump 810 when costs are high only if the cistern is nearly empty (below the first threshold), and runs the well pump 810 when costs are low and the cistern is low (below the second threshold) or when solar power is available, coordinating pump operation to avoid overloading the solar panels 808.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system comprising:
   an induction-type AC electric motor having a starting winding, and a run winding;
   an AC input connection;
   a multiphase variable frequency motor (VFD) drive having at least a first and a second phase output;
   a switching apparatus having at least a first and a second position;
   wherein with the switching apparatus in the first position, a first output of a variable frequency motor drive is coupled to the run winding of the AC electric motor, and a second output of the variable frequency motor drive is coupled to the start winding of the AC electric motor; and
   with the switching apparatus in the second position, the run winding of the AC electric motor is coupled to the AC input connection and the start winding of the AC electric motor is coupled through a capacitor and start switch to the AC input connection;
   wherein, with the switching apparatus in the first position, the second output of the VFD is configured to discontinue driving the start winding of the motor after the motor begins rotating.

2. The system of claim 1 wherein the switching apparatus is controlled by a microcontroller.

3. The system of claim 2 wherein the VFD drive is configured with maximum power point tracking (MPPT).

4. The system of claim 3 wherein the VFD drive is a three-phase VFD drive, and wherein a third output of the VFD drive is coupled to a common connection of the run winding and start winding of the induction-type AC electric motor when the switching apparatus is in the first position.

5. The system of claim 3 wherein the VFD drive is a two-output VFD drive with an approximately 90-degree phase shift between the first and second output of the VFD drive.

6. The system of claim 3 further comprising a power price receiving device and configured to minimize cost of power used.

7. A method of operating a single-phase AC electric motor having a run winding and
  a start winding on AC line or solar power comprising:
  providing a switching apparatus having at least a first and a second position, wherein with the switching apparatus in the first position, a first output of a variable frequency motor drive is coupled to the run winding of the AC electric motor, and a second output of the variable frequency motor drive is coupled to the start winding of the AC electric motor; and
  with the switching apparatus in the second position, the run winding of the AC electric motor is coupled to an AC line input connection and the start winding of the AC electric motor is coupled through a capacitor and start switch to the AC input connection;
  determining whether solar power is present, and if solar power is present setting the switching apparatus to the first position, attempting to start the motor with a phase shift between the first and second output of the variable frequency drive, and if the motor starts disconnecting the second output of the variable frequency drive;
  if solar power was not present or the motor failed to start, setting the switching apparatus to the second position.

8. The method of claim 7 wherein the VFD drive is a three-phase VFD drive, and wherein a third output of the VFD drive is coupled to a common connection of the run winding and start winding of the induction-type AC electric motor when the switching apparatus is in the first position.

9. The method of claim 8 wherein the VFD drive is configured with maximum power point tracking (MPPT).

10. The method of claim 7 wherein the VFD drive is a two-output VFD drive with an approximately 90-degree phase shift between the first and second output of the VFD drive.

11. The method of claim 10 wherein the VFD drive is configured with maximum power point tracking (MPPT).

* * * * *